United States Patent
Seghezzi

(10) Patent No.: US 7,370,677 B2
(45) Date of Patent: May 13, 2008

(54) GAS MIXTURE, IN PARTICULAR FOR INFLATING THE TIRES OF VEHICLES

(75) Inventor: Andrea Seghezzi, Monza (IT)

(73) Assignee: Sapio Produzione Idrogeno Ossigeno (IT)

(*) Notice: Subject to any disclaimer, the term of this patent is extended or adjusted under 35 U.S.C. 154(b) by 5 days.

(21) Appl. No.: 10/551,229

(22) PCT Filed: Jan. 28, 2004

(86) PCT No.: PCT/IT2004/000021

§ 371 (c)(1),
(2), (4) Date: Jun. 16, 2006

(87) PCT Pub. No.: WO2005/072990

PCT Pub. Date: Aug. 11, 2005

(65) Prior Publication Data

US 2007/0051420 A1    Mar. 8, 2007

(51) Int. Cl.
*B65B 1/04* (2006.01)
(52) U.S. Cl. ............................... 141/9; 141/38
(58) Field of Classification Search .......... 141/37, 141/38, 98, 2, 9, 82; 152/427; 523/166; 62/46.1
See application file for complete search history.

(56) References Cited

U.S. PATENT DOCUMENTS

| | | | |
|---|---|---|---|
| 2,991,629 A * | 7/1961 | Rose | 62/46.1 |
| 3,877,496 A | 4/1975 | Sperberg | |
| 4,513,803 A * | 4/1985 | Reese | 152/427 |
| 5,254,400 A * | 10/1993 | Bonner et al. | 428/305.5 |
| 5,338,776 A * | 8/1994 | Peelor et al. | 523/166 |
| 5,765,601 A * | 6/1998 | Wells et al. | 141/38 |
| 6,889,723 B2 * | 5/2005 | Gerresheim et al. | 141/38 |
| 2002/0123436 A1 | 9/2002 | Osumi et al. | |

FOREIGN PATENT DOCUMENTS

GB    817 943    8/1959

OTHER PUBLICATIONS

International Search Report for International Application No. PCT/IT 2004/000021 Dated Oct. 14 2004, 2 page(s).

* cited by examiner

*Primary Examiner*—Timothy L. Maust
(74) *Attorney, Agent, or Firm*—Greenberg Traurig, LLP

(57) ABSTRACT

A gaseous composition particular suitable for inflating the tires of vehicles with a high heat transfer capacity that results in tires having a longer life and better performance. In one aspect, this composition is based on hydrofluorocarbons, and is capable of effectively conducting the heat generated during the rotation of the tire to the wheel rim and at a more or less constant pressure. In one aspect, the wheel rim acts as a radiator, exchanging the heat with the outside air, maintaining the tire temperature low and preventing it from overheating.

2 Claims, 1 Drawing Sheet

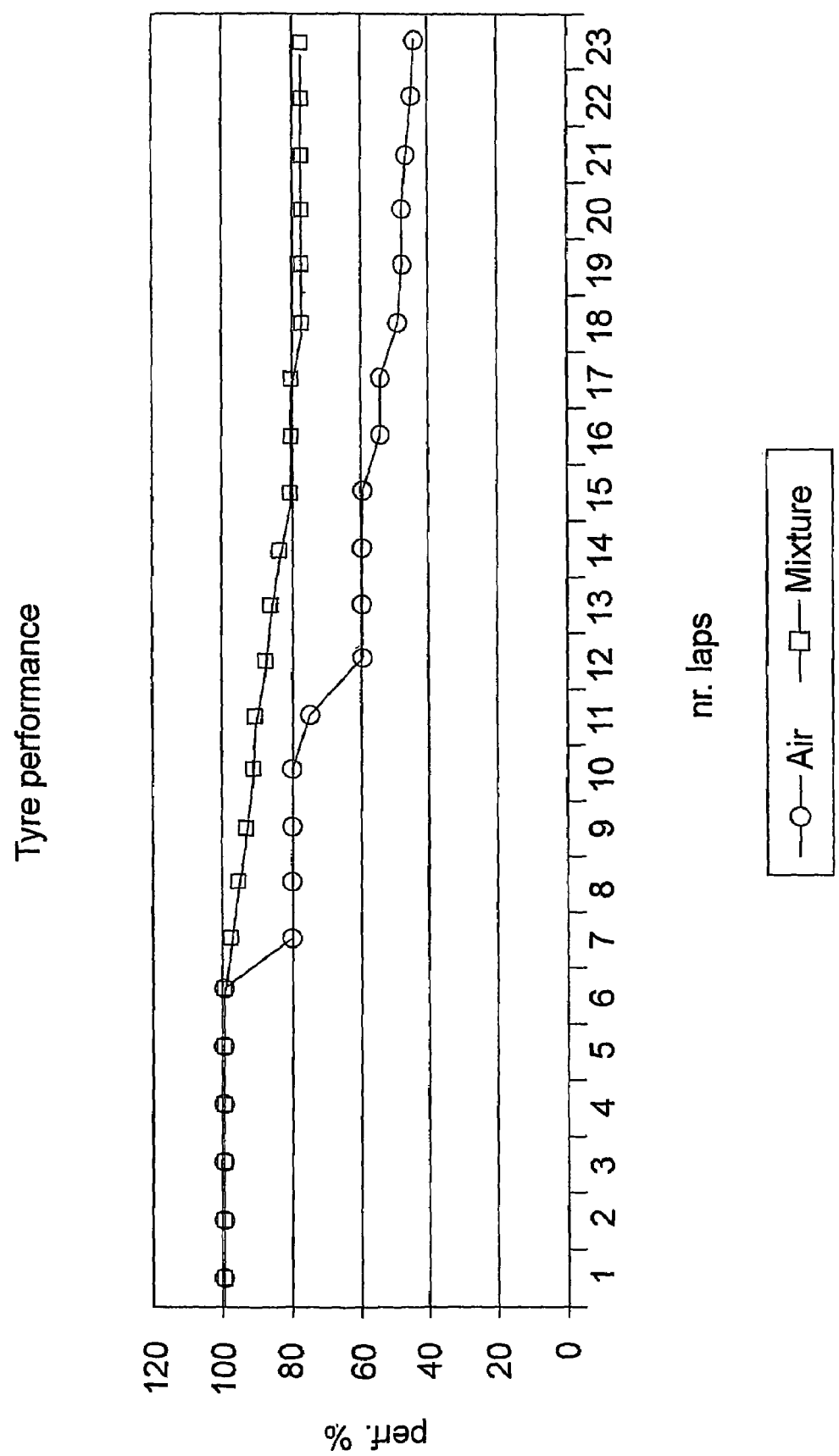

GAS MIXTURE, IN PARTICULAR FOR INFLATING THE TIRES OF VEHICLES

This application is a national stage filing under 35 U.S.C. 371 of International Application PCT/IT2004/000021, filed on Jan. 28, 2004. International Application PCT/IT2004/000021 was published under PCT Article 21(2) in English.

TECHNICAL FIELD

This invention concerns a gaseous composition particularly suited for use in inflating the tires of vehicles.

More in particular, this invention refers to a gaseous composition which is designed to be used to inflate the tires of vehicles to achieve improvements from the point of view of performance and the overall life of the tire.

This invention can be applied in the industrial sector for the production of non-combustible gases, and in particular in the production of gas mixtures for the inflation of tires.

BACKGROUND ART

It is known that the tires of vehicles are inflated with compressed air which is injected into the inner chamber of the tire through the valve, until the correct working pressure is reached.

It is also known that in the event of long road journeys especially in the summer or in the case of extreme conditions, such as during competitions with sports vehicles, the tires tend to overheat and the pressure to increase. The hot air in the tires tends to damage the structure of the tire due to oxidation and ozonolysis phenomena.

These phenomena produce dangerous and uncontrollable effects on the tires, which after traveling a certain distance on the road or track undergo a sudden drop in performance, with a considerable limitation in the life of the tires as a result of mechanical and thermo-oxidative stress.

In particular, according to the results of standard length track tests, it was found that vehicle tires normally inflated with compressed air traditionally undergo a sudden drop in performance after the sixth or seventh lap, continuing to decrease and making frequent gear changes necessary.

To overcome this limitation in the performance of air-inflated tires, the use of gas mixtures was tested and a series of gases were selected on the basis of various properties.

The use of these gases or mixtures did not, however, lead to appreciable results, and it was found that tires traditionally inflated with these nitrogen, helium or argon-based gaseous mixtures, and the tires of track sports vehicles, also undergo a sudden drop in performance after a certain number of laps, making it necessary to replace them after a short time.

In fact the critical temperature for some racing tires is 130° C., over which the tire "shatters", in other words the part which would normally be worn out on the asphalt surface becomes detached from the pressurized chamber.

The construction of tires with this known technology is carried out in two stages: the first being the pressure chamber, the second the rubber mix, which is worn out on the asphalt.

When the two parts are superimposed and vulcanized, small air bubbles could remain trapped between the two parts, and an increase in temperature over 130° C. would cause them to increase in volume finally forming blisters that would inevitably explode.

DESCRIPTION OF THE INVENTION

This invention proposes to provide a gaseous mixture or composition that can be used to inflate the tires of vehicles, thus obtaining improvements from the point of view of performance and of the overall life of the tire, by controlling the-temperature, thus eliminating or at least reducing the disadvantages described above.

The invention also proposes to provide a gaseous composition that be easily produced, thus making it economically advantageous.

This is achieved by means of a gaseous composition for the inflation of vehicle tires and having the features described in the main claim.

The dependent claims describe advantageous embodiments of the invention.

The gaseous composition according to the invention presents a first fundamental feature, a high capacity of heat transfer. This is therefore a gas mixture that is able to effectively conduct the heat from the rubber tire during rotation to the wheel rim. The latter, particularly when made from aluminum or magnesium, acts as a radiator, exchanging the heat with the outside air, preventing the tire from becoming overheated.

Thanks to the high capacity of heat transfer, tires inflated with this gaseous composition achieve excellent results from the point of view of their life, since the temperature of the tire is kept low and the pressure is constant. This minimizes damage due to oxidation and ozonolysis, thus extending the life of the tires subjected to mechanical and thermo-oxidative stress.

These gases and mixtures according to the invention are based on gaseous components whose use makes it possible to achieve the result whereby the more the speed increases the more effective the heat exchange is.

The mixture according to the invention comprises various percentages of a series of hydrofluorocarbons.

According to an advantageous embodiment, these hydrofluorocarbons consist of pentafluoroethane, trifluoroethane and tetrafluoroethane.

According to a particularly advantageous embodiment of the invention, the basic mixture comprises:

| | |
|---|---|
| Pentafluoroethane HFC 125 | 44% |
| Trifluoroethane HFC 143 A | 52% |
| Tetrafluoroethane HFC 134 A | 4% |

The mixture of these components makes it possible to obtain a base element called HFC R404A.

According to another advantageous embodiment of the invention, this gaseous mixture can be combined with a certain percentage of carbon dioxide.

In this case, numerous gaseous combinations are possible; however, experiments have demonstrated a particular efficacy of the mixture obtained according to the following composition:

| | |
|---|---|
| $CO_2$ | 50% |
| HFC 125 | 22% |
| HFC 143 A | 26% |
| HFC 134 A | 2% |

Numerous advantages can be obtained with the use of the mixture according to the invention.

First of all, tires inflated with this mixture have a constant performance, and the sudden drop in performance does not occur (graph 1). A certain drop in performance was, however detected, but is more gradual and above all occurs after around 11 or 12 laps.

The use of the mixture according to the invention in tires fitted on motorcycles keeps the pressure more or less constant, reducing the vibration phenomena which are felt above all on the front tire (chattering effect).

The rotating mass below the shock absorbers normally has a disturbance frequency of 15-18 Hz, while the more constant pressure achieved with this mixture makes it possible to damp this effect, reducing it to 7-9 Hz, (data taken from superimposed telemetric systems).

The working temperature also remains below the critical threshold. When the mixture according to this invention is used, the temperature of the tire ever increases beyond 120° C. This is a very important fact considering that the critical temperature for some racing tires is 130° C., over which the, tire "shatters", i.e. the part that is normally worn out on the asphalt becomes detached from the pressurized chamber.

The new mixture according to the invention absorbs the temperature and transmits it to the wheel rim which acts as a radiator, keeping the temperature of the tire "low" by exploiting the high heat transmission coefficient of the gas combination which transmits and dissipates the temperature by conduction.

With the new mixture according to the invention, the tire is subject to less wear, the shavings are four times smaller compared to those with an air-inflated tire and after a race a mixture-inflated tire loses half the weight compared to an air-inflated tire.

Thanks to the use of the mixture according to the invention, it will also be possible to manufacture softer tires, improving the "grip" and the consequent lap time for competition vehicles, guaranteeing the team a better performance with respect to other tire manufacturers.

DESCRIPTION OF THE DRAWINGS

Other features and advantages of the invention will become evident on reading the following description of one embodiment of the invention, given as a non-binding example, with the help of the enclosed drawing, in which FIG. 1 is a graph representing the performance of tires in relation to the laps covered on a standard length track in the two conditions of inflation with air and with the gas mixture.

DESCRIPTION OF ONE EMBODIMENT OF THE INVENTION

The gaseous composition according to the invention suitable to be used to inflate vehicle tires consists of a mixture of hydrofluorocarbons.

In particular, according to a particularly advantageous embodiment, this composition comprises a basic component named HFC R404A consisting of:

| | |
|---|---|
| Pentafluoroethane HFC 125 | 44% |
| Trifluoroethane HFC 143 A | 52% |
| Tetrafluoroethane HFC 134 A | 4% |

Advantageously, the use of this gaseous mixture can be combined with a certain percentage of carbon dioxide, according to the following preferred composition:

| | |
|---|---|
| $CO_2$ | 50% |
| HFC 125 | 22% |
| HFC 143 A | 26% |
| HFC 134 A | 2% |

Basically, the gaseous mixtures obtained consist of hydrofluorocarbons and more in general of gases characterised by their high capacity of storing cold heat as well as having a high heat transfer coefficient.

The achieved effects of the mixtures refer mainly to a more constant temperature of the inflated tires, a more constant pressure and the possibility of using softer mixes, and consequently providing better track performance.

First of all, tires inflated with this mixture have a constant performance, with no sudden drop, as can be seen in the diagram in FIG. 1.

As this diagram shows, a certain drop in performance was noted, but this is more gradual and above all it occurs after around 11 or 12 laps.

The table below indicates the data relative to the behavior of tires inflated with various gas mixtures and subjected in an artificial environment to temperature and pressure tests on the basis of the test time measured in minutes.

The tests were carried out only on rear tires since they are more subject to temperature problems.

During the tests the tires were rotated for a period of time at a certain speed; the speed was then increased until the tires burst.

The tests were accordingly carried out by rotating the tires on a surface with a load of 162 kg at an ambient temperature of 250° C. and at increasing speeds: for the first 20 minutes at 115 kmph and for subsequent intervals of 10 minutes at increasing speeds from 230 to over 300 kmph.

The first column in the table indicates the various mixtures used in the two rear tires.

The second column indicates the temperatures of the tires after 60 minutes of testing and the third column the tire pressure after 60 minutes.

The fourth column indicates the temperature values when the tire busts and the fifth the time in minutes after which the tire burst, while the sixth and last column shows the pressure in bars at the time of bursting.

As can be seen, the mixture giving the best performance is the one indicated in the seventh and the eleventh line, consisting of 50% of 404 and 50% of CO2.

The results measured with the use of this high-performance mixture indicated the longest times at tire bursting, i.e. 103 and 117 minutes, which are higher than all the other values.

At the end of the test period, the high-performance mixture made it possible to increase performance by 22.1%, and the tires burst at a much higher speed, this result being achieved by a lowering of the temperature according to the essential features of the new mixture, and by maintaining the pressure at the inflation values.

| Gas Type | Tire Tempature after 60 min (° C.) | Tire Pressure after 60 min (bar) | Tire Bursting Temp. (° C.) | Tire Life before Bursting (min) | Tire Bursting pressure (bar) |
|---|---|---|---|---|---|
| Nitrogen Tire 1 | | | 91 | 33 | 3.25 |
| Nitrogen Tire 2 | 101 | 3.27 | 128 | 64 | 3.30 |
| Helium Tire 1 | | | 125 | 55 | 3.25 |
| Helium Tire 2 | 103 | 3.15 | 108 | 65 | 3.16 |
| $CO_2$ Tire 1 | 94 | 3.09 | 136 | 76 | 3.11 |
| $CO_2$ Tire 2 | 111 | 3.10 | 135 | 71 | 3.15 |
| 507 Tire 1 | 96 | 3.20 | 132 | 89 | 3.25 |
| 507 Tire 2 | 88 | 3.18 | | 91 | 3.20 |
| 404 Tire 1 | 92 | 3.30 | 119 | 78 | 3.34 |
| 404 Tire 2 | 81 | 3.25 | 124 | 95 | 3.35 |
| 134 Tire 1 | 99 | 3.16 | 114 | 70 | 3.22 |
| 134 Tire 2 | 92 | 3.20 | 112 | 70 | 3.21 |
| 404 50% $CO_2$ 50% | 85 | 3.00 | 119 | 103 | 3.05 |
| 404 75% $CO_2$ 25% | 93 | 3.15 | 149 | 101 | 3.25 |
| 507 50% $CO_2$ 50% | 91 | 3.27 | 157 | 98 | 3.35 |
| 507 75% $CO_2$ 25% | 95 | 3.27 | 120 | 94' | 3.35 |
| 404 50% $CO_2$ 50% | 91 | 3.15 | 148 | 117 | 3.29 |
| 404 25% $CO_2$ 75% | 93 | 3.10 | 137<br>137 | 102 | 3.18 |

Once the most suitable mixture had been found, the tires were analysed to check whether the mixture could have damaged the elastomer or its components in any way.

The perfect integrity of the elastomer and its main components was confirmed and, thanks to solid state high resolution NMR spectroscopy, the various samples inflated with the various gases and mixtures were compared. These tests confirmed that the sample inflated with the high-performance mixture gave the best results, minimising the damage due to oxidation and ozonolysis, extending the life of the tire subjected to mechanical and thermo-oxidative stress.

The gas mixture according to the invention can be used in the tires of airplanes, trucks, articulated trucks, buses, cars or other vehicles, with greater performance in terms of life, rotating silence and lower fuel consumption due to the more stable conditions inside the chamber, all in total safety since the mixture is completely inert. Especially for heavy vehicles, this means that in the event of a tire catching fire, as a result of its bursting and of the high temperature, the gas would extinguish the fire.

As can be seen, this gas mixture makes it possible to achieve all the results described above, including above all those relative to the fact that the tires inflated with this mixture give a constant performance and the traditional sudden drop in performance does not occur.

The invention is described above with reference to a preferred embodiment.

It is nevertheless clear that the invention is susceptible to numerous variations, within the framework of technical equivalents.

The invention claimed is:

1. A method of minimizing heat retention in a gas within a tire rotating on a surface, the method comprising:
    providing a tire, said tire mounted on a metal rim;
    inflating the tire with a gas mixture comprising carbon dioxide in a weight percentage less than or equal to 50% and a hydrofluorocarbon mixture in a weight percentage of at least 50%, said hydrofluorocarbon mixture consisting of at least one of a pentafluoroethane HFC 125, trifluoroethane HFC 143 A, and tetraluoroethane HFC 124 A; and
    rotating said tire under a load on the surface.

2. The gas mixture of claim 1, wherein said hydrofluorocarbon mixture comprises 44% by weight of pentafluoroethane HFC 125, 52% by weight of trifluoroethane HFC 143A, and 4% by weight of tetrafluoroethane HFC 134A.

* * * * *